United States Patent
Yeung et al.

(10) Patent No.: US 10,423,865 B1
(45) Date of Patent: Sep. 24, 2019

(54) SYSTEM AND METHOD OF PREDICTION OF PAPER JAMS ON MULTIFUNCTION PERIPHERALS

(71) Applicants: Kabushiki Kaisha Toshiba, Minato-ku (JP); Toshiba TEC Kabushiki Kaisha, Shinagawa-ku (JP)

(72) Inventors: Michael Yeung, Mission Viejo, CA (US); Manju Sreekumar, Irvine, CA (US); Milong Sabandith, Irvine, CA (US); Methee Phoboonme, Irvine, CA (US); Louis Ormond, Irvine, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 15/913,057

(22) Filed: Mar. 6, 2018

(51) Int. Cl.
| | |
|---|---|
| *G03G 15/00* | (2006.01) |
| *G06K 15/02* | (2006.01) |
| *G06F 3/12* | (2006.01) |
| *G06F 11/30* | (2006.01) |
| *G06K 15/00* | (2006.01) |

(52) U.S. Cl.
CPC ......... *G06K 15/4085* (2013.01); *G03G 15/55* (2013.01); *G03G 15/70* (2013.01)

(58) Field of Classification Search
None
See application file for complete search history.

(56) References Cited

U.S. PATENT DOCUMENTS

| | | | | |
|---|---|---|---|---|
| 5,023,817 A | * | 6/1991 | Au | G03G 15/55 365/209 |
| 5,715,496 A | * | 2/1998 | Sawada | G06F 11/0733 399/10 |
| 5,913,090 A | * | 6/1999 | Sawada | G03G 15/70 399/21 |
| 2002/0091972 A1 | * | 7/2002 | Harris | G06F 11/008 714/47.2 |
| 2003/0065409 A1 | * | 4/2003 | Raeth | G05B 9/02 700/31 |
| 2005/0248805 A1 | * | 11/2005 | Shima | H04N 1/00244 358/1.15 |

(Continued)

FOREIGN PATENT DOCUMENTS

JP 03-293369 * 12/1991 ............ G03G 15/00

*Primary Examiner* — Beniyam Menberu
(74) *Attorney, Agent, or Firm* — Ulmer & Berne LLP

(57) ABSTRACT

A system and method for paper jam prediction includes a processor, memory and a network interface. Ongoing paper jam data is received from an identified, networked multi-function peripheral. Service call data for the multifunction peripheral indicative of prior service calls is stored in the memory. A sampling window of the paper jam data prior to a service call date is defined and a point in the sampling window when no symptoms of a forthcoming paper jam were present is determined so as to define a prediction window. A relationship between paper jam data in the prediction window of the sampling window and paper jam data outside the prediction window in the sampling window is determined and incoming paper jam data is monitored relative to the relationship data. A paper jam warning is generated when monitored incoming paper jam data indicates a forthcoming paper jam on the multifunction peripheral.

20 Claims, 11 Drawing Sheets

(56) References Cited

U.S. PATENT DOCUMENTS

| | | | |
|---|---|---|---|
| 2005/0286916 A1* | 12/2005 | Nakazato | G03G 15/6573 399/16 |
| 2006/0218272 A1* | 9/2006 | Murakami | G06F 3/1204 709/224 |
| 2006/0291871 A1* | 12/2006 | Yamaguchi | H04N 1/00002 399/8 |
| 2011/0029824 A1* | 2/2011 | Scholar | G05B 23/0224 714/47.3 |
| 2012/0013936 A1* | 1/2012 | Sawada | G06K 15/402 358/1.14 |
| 2013/0190095 A1* | 7/2013 | Gadher | G06F 11/008 463/42 |
| 2014/0143610 A1* | 5/2014 | Nakatsugawa | G06F 11/008 714/47.3 |
| 2015/0205658 A1* | 7/2015 | Towata | G06F 11/0733 714/47.3 |
| 2015/0249771 A1* | 9/2015 | Young | G06F 3/121 358/1.14 |
| 2016/0092848 A1* | 3/2016 | Nakajima | G06Q 10/20 705/26.81 |
| 2016/0379144 A1* | 12/2016 | Mizuno | G06Q 10/0635 705/7.28 |

* cited by examiner

| call date | problem | id | error count | page printed | ... | rolling avg(count) |
|---|---|---|---|---|---|---|
| 0 | 1 | | ... | ... | | ... |
| -1 | 1 | | ... | ... | | ... |
| : | 1 | | | | | |
| -5 | 1 | | ... | | | |
| -6 | 1 | | ... | | | |
| -7 | 0 | | ... | | | |
| -8 | 0 | | | | | |
| : | 0 | | | | | |
| -12 | 0 | | | | | |
| -13 | 0 | | | | | |
| : | 0 | | | | | <incomplete> |
| -19 | 0 | | | | | <incomplete> |
| -20 | 0 | | | | | <incomplete> |

Fig. 11

SYSTEM AND METHOD OF PREDICTION OF PAPER JAMS ON MULTIFUNCTION PERIPHERALS

TECHNICAL FIELD

This application relates generally to maintenance of document processing devices. The application relates more particularly to predicting paper jams for multifunction peripherals to minimize device downtime and facilitate prophylactic device repair.

SUMMARY

In an example embodiment a system and method for paper jam prediction includes a processor, memory and a network interface. Ongoing jam data is received from an identified, networked multifunction peripheral. Service call data for the multifunction peripheral indicative of prior service calls placed for it is stored in the memory. A sampling window of the paper jam data prior to a service call date is defined and a point in the sampling window when no symptoms of a forthcoming paper jam were present is determined so as to define a prediction window. A relationship between paper jam data in the prediction window of the sampling window and paper jam data outside the prediction window in the sampling window is determined and incoming paper jam data is monitored relative to the relationship data. A paper jam warning is generated when monitored incoming paper jam data indicates a forthcoming paper jam on the multifunction peripheral.

In a further example, the processor is further configured to determine a standard deviation value for incoming paper jam data relative to the rolling window.

In a further example, the relationship data corresponds to a determined standard deviation.

In a further example, the paper jam data includes data corresponding to a frequency of paper jams.

In a further example, the memory is further configured to store replacement part data corresponding to replacement parts associated with the multifunction peripheral and wherein the processor is further configured to monitor incoming paper jam data relative to the replacement part data.

In a further example, the processor is further configured to initiate a service call request in accordance with a generated paper jam warning.

In a further example, the processor is further configured to generate a service call request identifying multifunction peripheral indicated for a forthcoming paper jam.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFP means any of the forgoing.

Given the expense in obtaining and maintain MFPs, MFPs are frequently shared by users and monitored by technicians via a data network for example using Simple Network Management Protocol (SNMP). As with any mechanical device, MFPs are subject to wear and tear. Paper movement through an MFP can be problematic when a device's parts are worn or when mechanical adjustments are required. Paper jams in an MFP can be particularly frustrating for device users. They can result in periods when a MFP is out of service, leaving users without a powerful office tool and causing user frustration when a jam must be cleared or an alternative MFP used, such as one that is not conveniently located or one without needed capabilities that were available on the out of service MFP.

Not only are paper jams a burden on end users, they can provide significant financial cost to MFP providers. A common business model for MFPs is one wherein a distributor enters into an end user agreement where the distributer provides a device, at little or no upfront cost. User charges are based a cost per page. This cost reflects device usage charges, as well as maintenance costs. If a paper jam that cannot be cleared by an end user occurs, or if jams are becoming more frequent, the end user must make a service call, and the distributor must dispatch a technician to fix the MFP. Significant human resource costs are associated with receiving a service call, logging a call, scheduling a service time, dispatching a service technician, and diagnosing and repairing the device. Such service costs can lower the distributor's profitability, increase the end user's cost per page, or both.

BRIEF DESCRIPTION OF THE DRAWINGS

Various embodiments will become better understood with regard to the following description, appended claims and accompanying drawings wherein:

FIG. 11 illustrates an example embodiment of machine learning training.

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Figure 1:
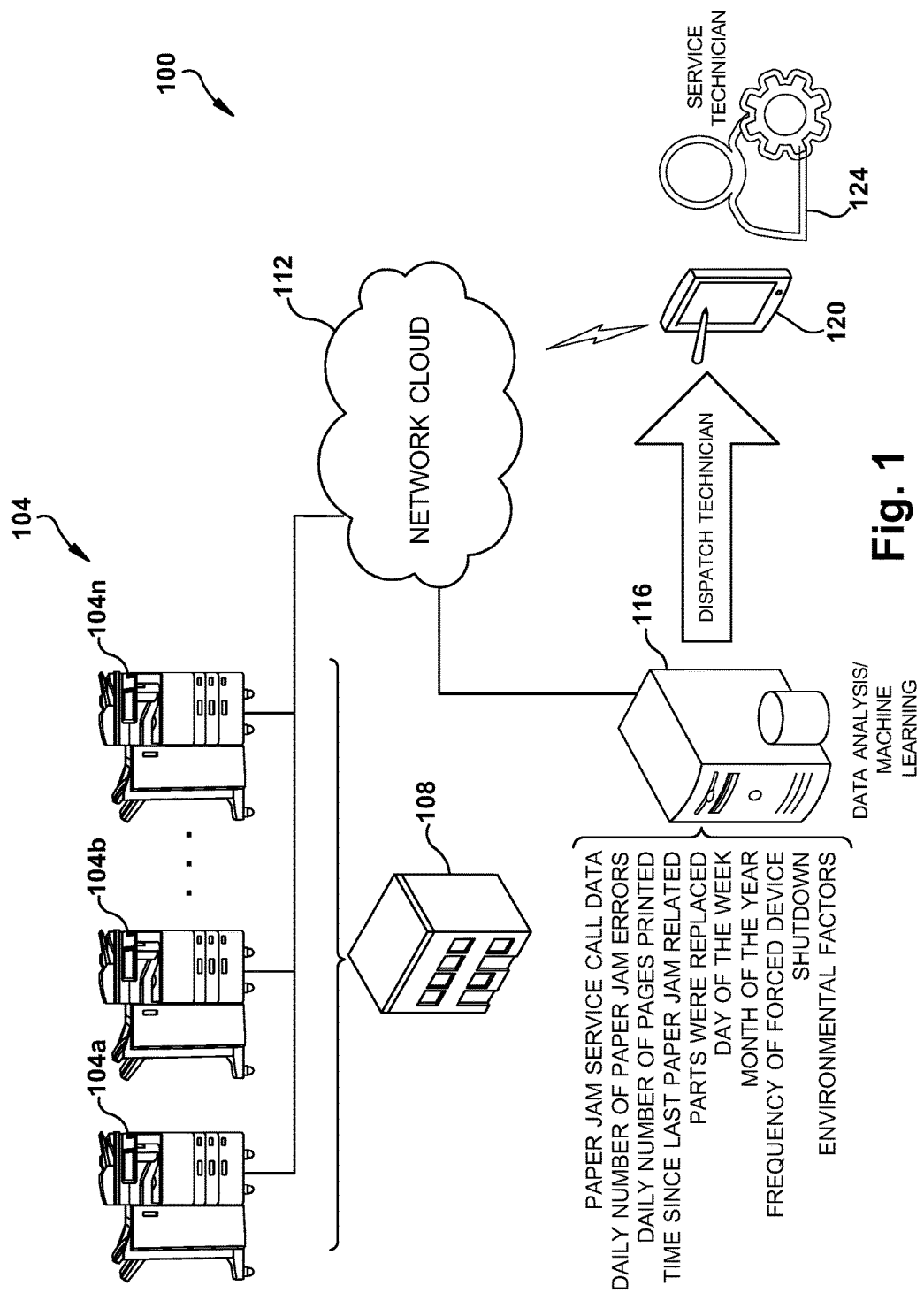
FIG. 1 is an example embodiment of a predicative device failure system.

Embodiments herein provide for automated monitoring of and MFPs state to facilitate prediction of paper jams. Such prediction can negate placing, receiving and processing of service calls. A technician may be dispatched in advance to address a failing MFP before it becomes problematic. If a nearby service call is already scheduled, the technician can address the failing MFP at the same time. Turning to FIG. 1, illustrated is example embodiment of a predicative paper jam system 100 that includes a plurality of MFPs 104, illustrated with 104a, 104b through 104n. The MFPs 104 are dispersed geographically. One or more MFPS 104 may be located at a single business location 108, over multiple locations for a single business, or among multiple businesses. All MFPs 104 are configured for data communication via network cloud 112, suitably comprised of some or all of a local area network (LAN) or wide area network (WAN) which may comprise the global Internet. Also in data communication with network cloud 112 is a data analysis and machine learning service suitably including one or more servers as illustrated by server 116. MFPs 104 each include one or more components configured to monitor one or more states of the device which are reported to server 116 which also stores additional information such as repair histories and device maintenance schedules, suitably coordinated with one or more service technicians.

Server 116 accumulates MFP data such as device error logs, device usage, such as number of print jobs or device page count, mechanical wear and tear tracking, forced shutdowns, copy interruptions or environmental factors such as temperature, humidity, ground stability, barometric pressure, and the like. Server 116 uses its available information to predict likely device failures in advance of an actual failure. This information can be communicated to a service center or service technician via a digital device, such as tablet computer 120 of service technician 124. Server 116 suitably associates suggested maintenance procedures and required part information with identified devices predicted to fail.

Figure 2:
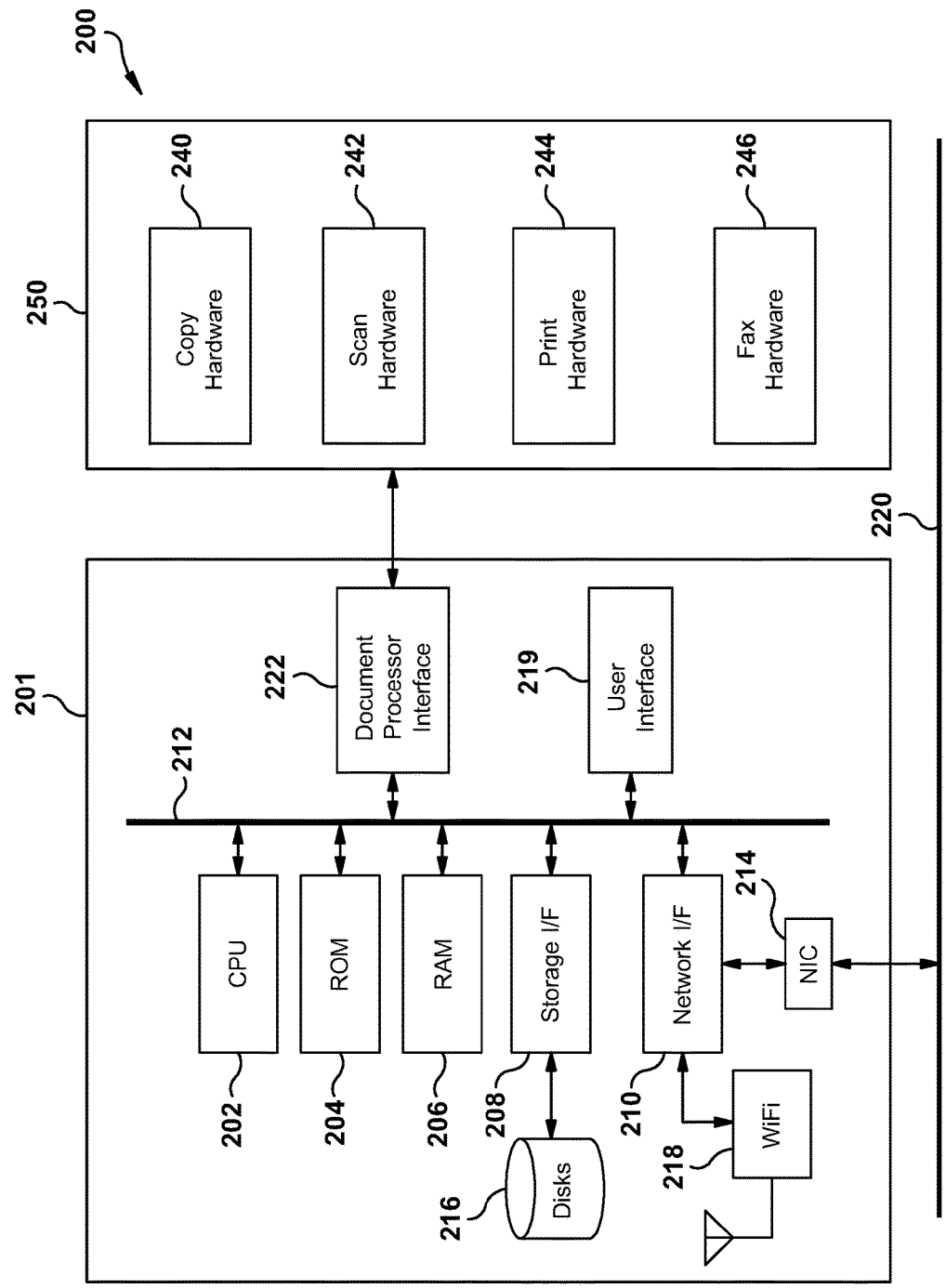
FIG. 2 is a networked document rendering system.

Turning now to FIG. 2 illustrated is an example embodiment of a networked digital device comprised of document rendering system 200 suitably comprised within an MFP, such as with MFPs 104 of FIG. 1. It will be appreciated that an MFP includes an intelligent controller 201 which is itself a computer system. Thus, an MFP can itself function as a cloud server with the capabilities described herein. Included in controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like. Processor 202 is also in data communication with user interface 219 for interfacing with displays, keyboards, touchscreens, mice, trackballs and the like.

Processor 202 can also be in data communication with any suitable user input/output (I/O) interface 219 which provides data communication with user peripherals, such as displays, keyboards, mice, track balls, touch screens, or the like.

Also in data communication with data bus 212 is a document processor interface 222 suitable for data communication with MFP functional units. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Figure 3:
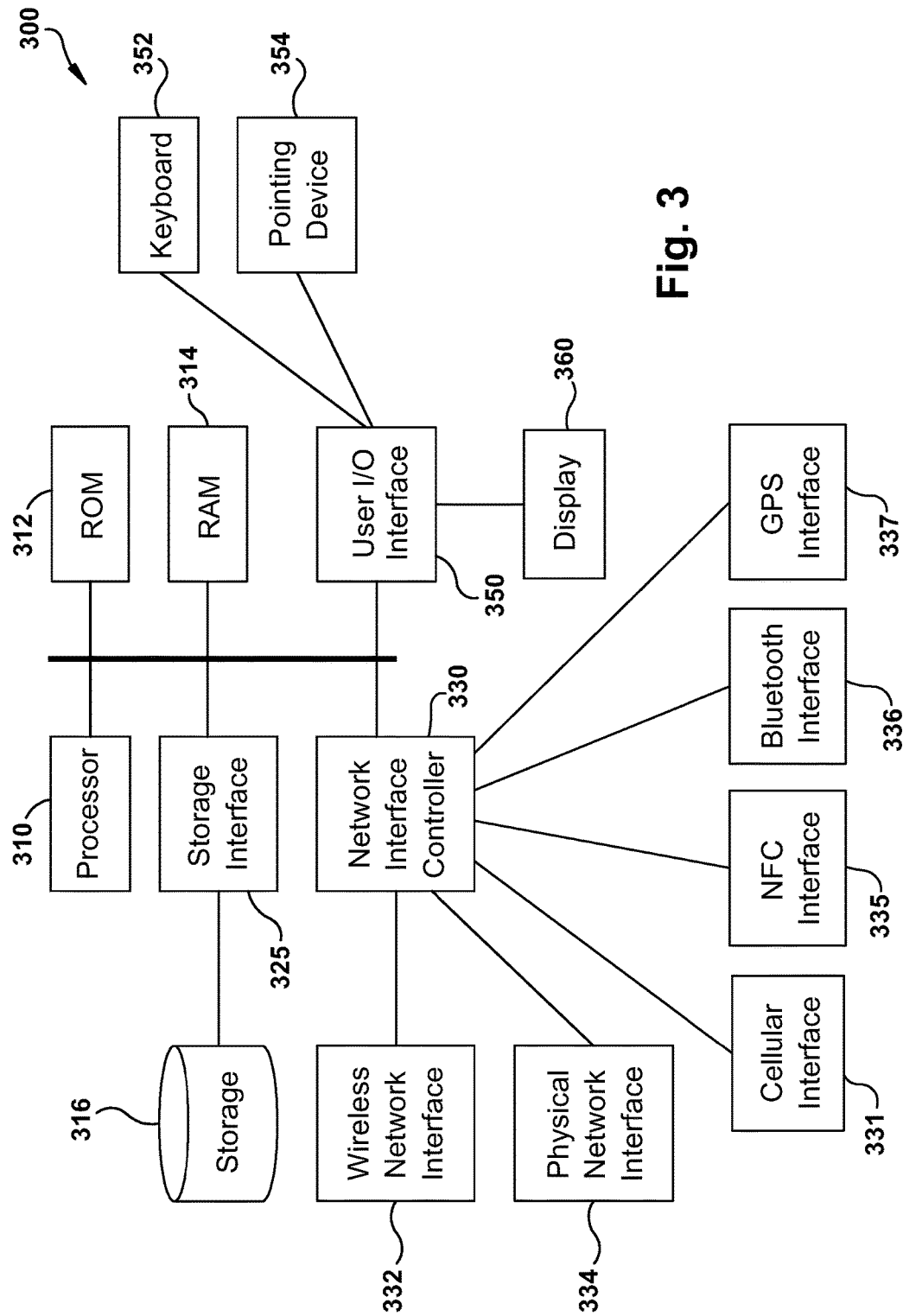
FIG. 3 is an example embodiment of a digital data processing device.

Turning now to FIG. 3, illustrated is an example embodiment of a digital data processing device 300 such as tablet computer 120 or server 116 of FIG. 1. Components of the data processing device 300 suitably include one or more processors, illustrated by processor 310, memory, suitably comprised of read-only memory 312 and random access memory 314, and bulk or other non-volatile storage 316, suitable connected via a storage interface 325. A network interface controller 330 suitably provides a gateway for data communication with other devices via wireless network interface 332 and physical network interface 334, as well as a cellular interface 331 such as when the digital device is a cell phone or tablet computer. Also included is NFC interface 335, Bluetooth interface 336, and GPS interface 337. A user input/output interface 350 suitably provides a gateway to devices such as keyboard 352, pointing device 354, and display 360, suitably comprised of a touch-screen display. It will be understood that the computational platform to realize the system as detailed further below is suitably implemented on any or all of devices as described above.

Figure 4:
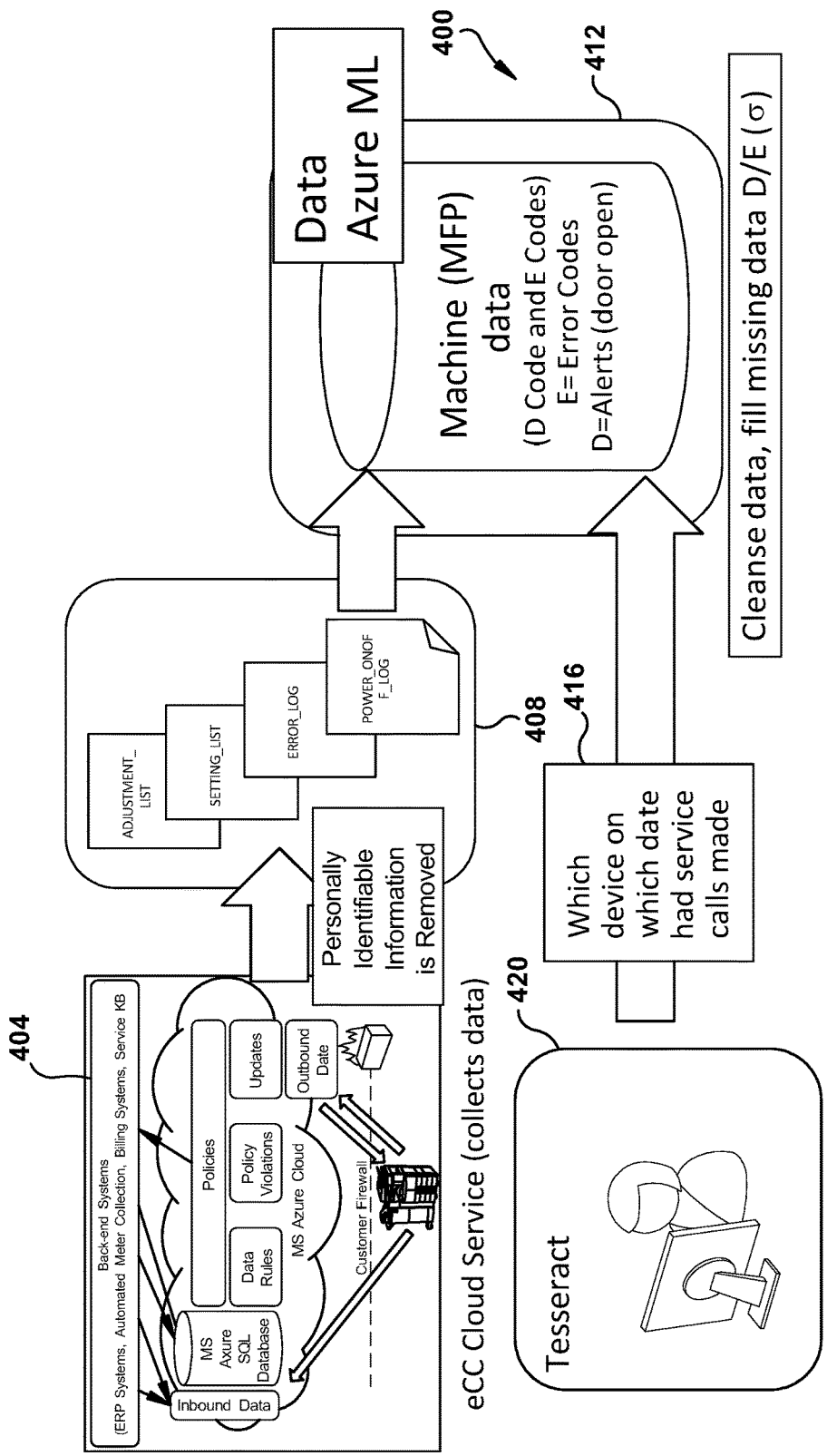
FIG. 4 is a flow diagram of a device error prediction system.

FIG. 4 is a flow diagram of a device error prediction system 400 such as one implemented in conjunction with server 116 of FIG. 1. Device monitoring is suitably accomplished with a device management system 404. By way of particular example, Toshiba TEC MFP devices are configurable and monitor able via their e-BRIDGE CloudConnect (eCC web) interface. e-BRIDGE CloudConnect is an integrated system of embedded and cloud-based applications that provide functionality to support remote monitoring and management of Toshiba MFPs. It enables management of configuration settings through automated interaction. e-BRIDGE CloudConnect gathers service information from connected MFPs, including meter data, to speed issue diagnosis and resolution.

Device management system 404 provides device state information 408 for application of machine learning and analysis for predictive device failures by a suitable machine learning platform 412 such as Microsoft Azure. Additional information for such prediction, such as device service log information, is provided by a suitable CMMS (Computerized Maintenance Management System (or Software)) 420, and is sometimes referred to as Enterprise Asset Management (EAM). By way of particular example a CMMS system 420 can be based on CMMS Software, Field Service Software, or Field Force Automation Software provided by Tessaract Corporation.

Figure 5:
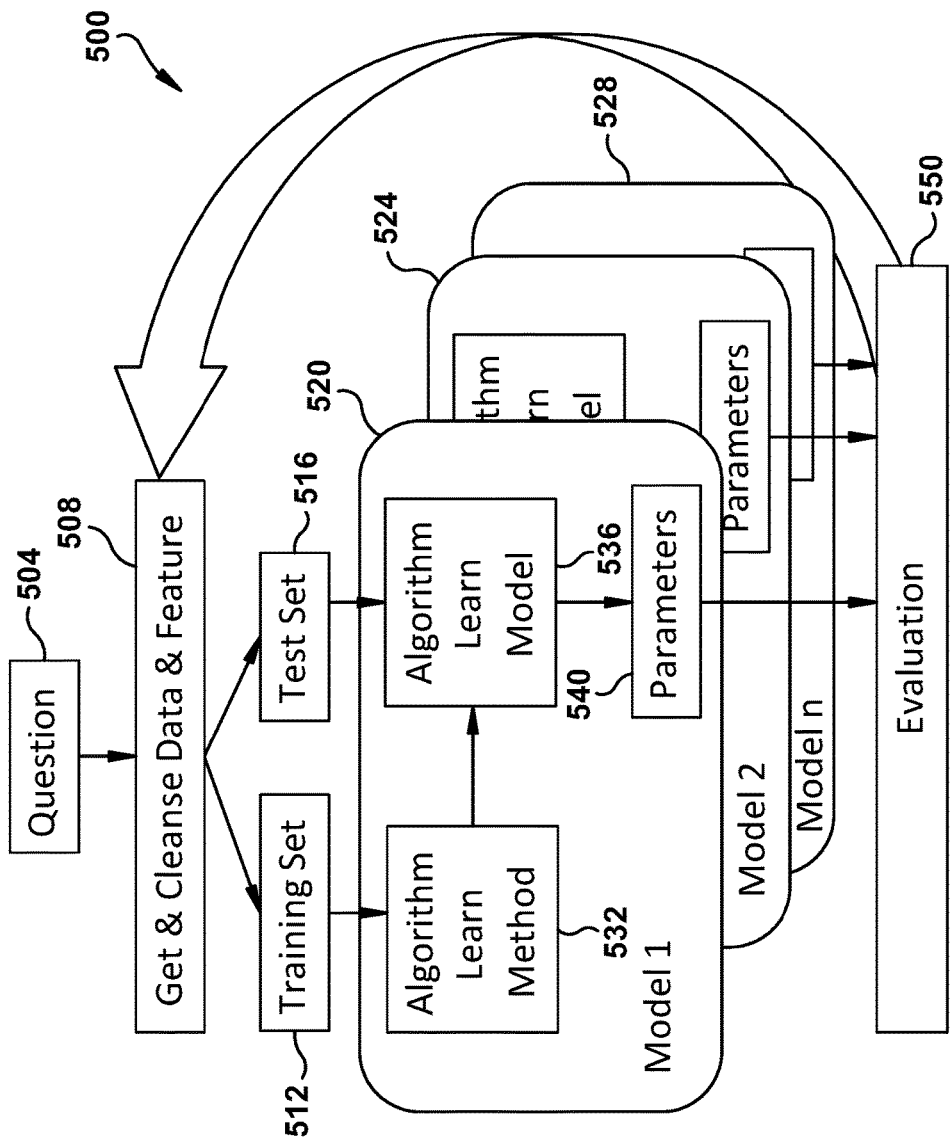
FIG. 5 is a flow diagram of an example embodiment of a machine learning system.

FIG. 5 illustrates a flow diagram 500 of an example embodiment of a machine learning system. In the example system, the process starts with one or more questions 504, such as when will a device likely fail and what aspects or aspects will be associated with such failure. Data is retrieved and cleansed of unneeded or problematic data at 508 and this data is provided for both training 512 and testing 516. These results are provided to a machine learning system, suitably comprised of one or more learning models such as learning models 520, 524 and 528. Each learning model 520, 524, 528 includes one or more algorithms learn method, such as algorithm learn methods 532 and 536 of learning model 520. Parameters, such as parameters 540 of learning model 520, are provided for evaluation at 550, and results are fed back to data acquisition at 508 for iterative calculation.

Figure 6:
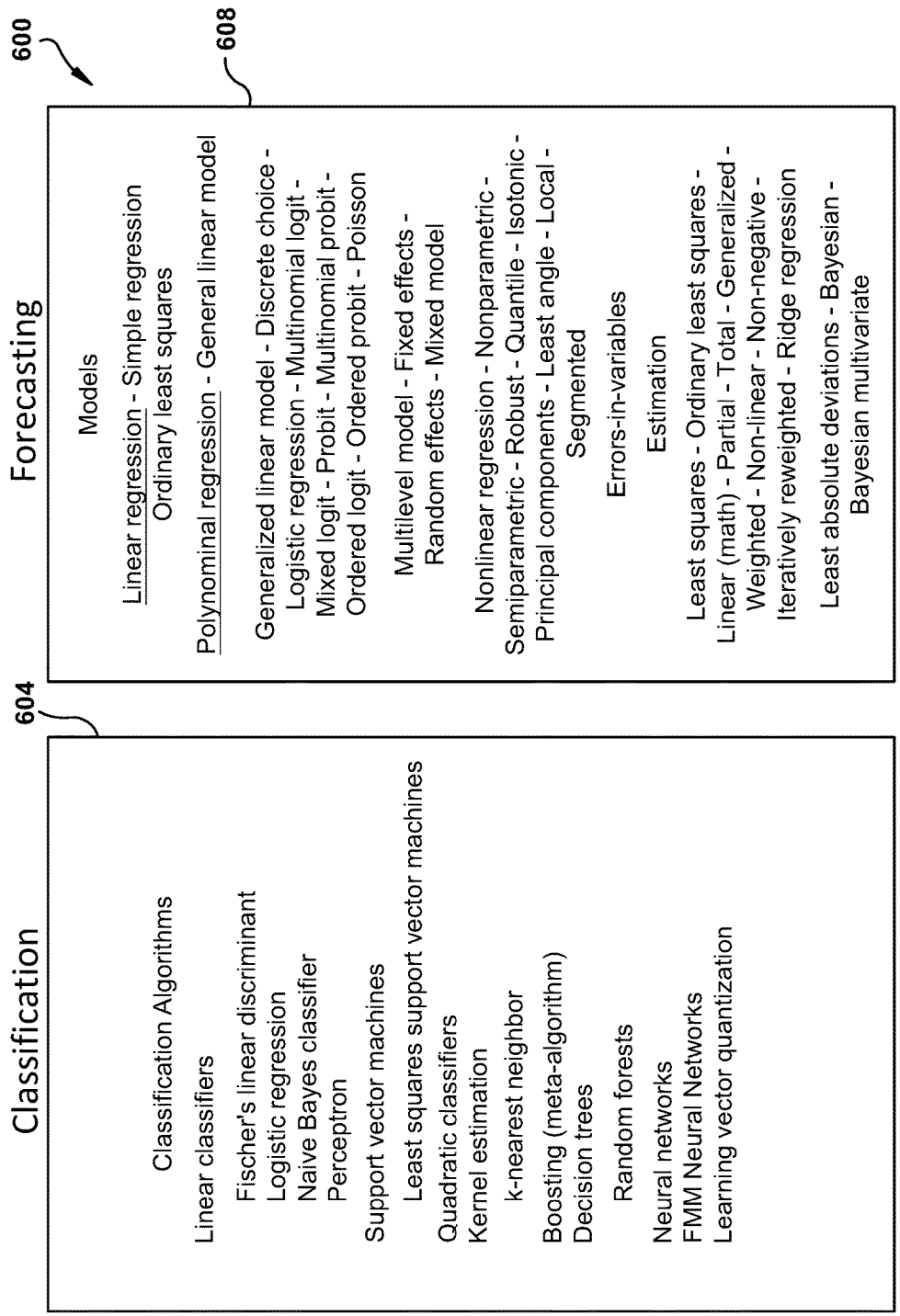
FIG. 6 is an illustration of example machine learning algorithms.
Figure 7:
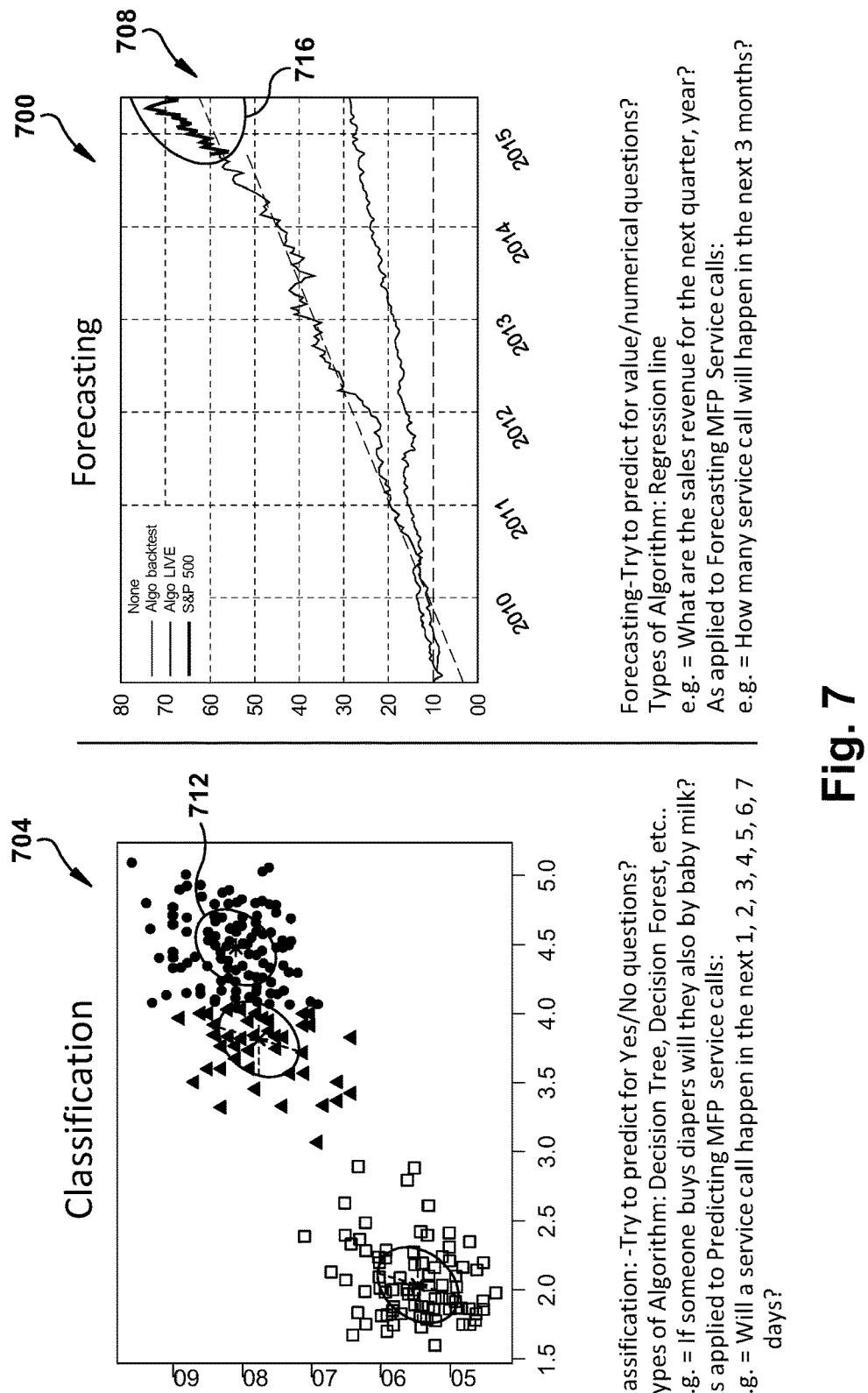
FIG. 7 illustrates example visual depictions of machine learning algorithm results.

FIG. 6 provides example machine learning algorithms 600 including classification algorithms 604 and forecasting algorithms 608. FIG. 7 provides example visual depictions of algorithm results 700, including classification results 704 and forecasting results 708. Device clusters, such as cluster 712 may be indicative of device error conditions with corresponding failure forecasting with results 716. By way of particular example, a determination of likeliness of a forthcoming service call can be utilized to schedule device maintenance. Such scheduling is suitably integrated with service calls already scheduled or with servicing of two or more geographically proximate devices to minimize travel time needed for technician on-site visits. Suitable machine learning systems are built on available third party platforms such as R-Script, Microsoft Azure, Google Next, Kaggle.com or the like.

Figure 8:
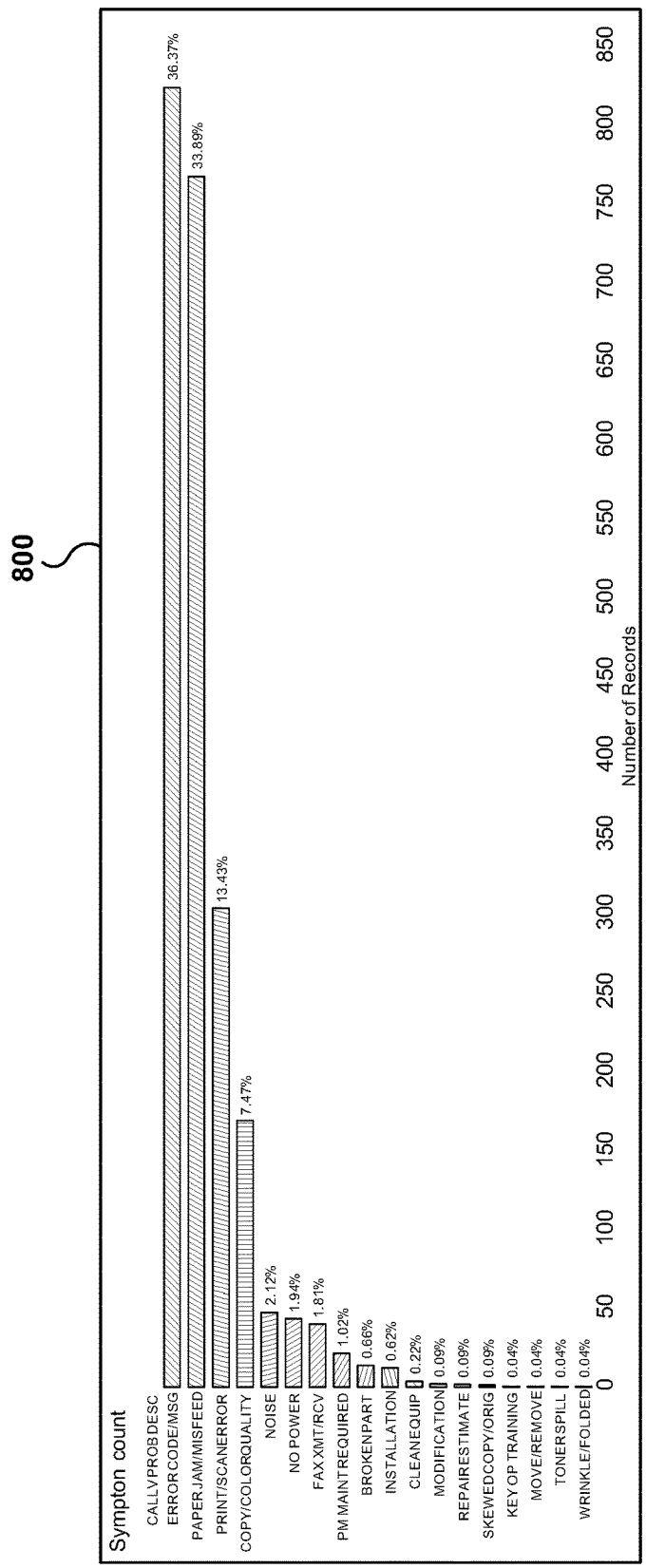
FIG. 8 is an example embodiment of a breakdown of device symptoms.
Figure 9:
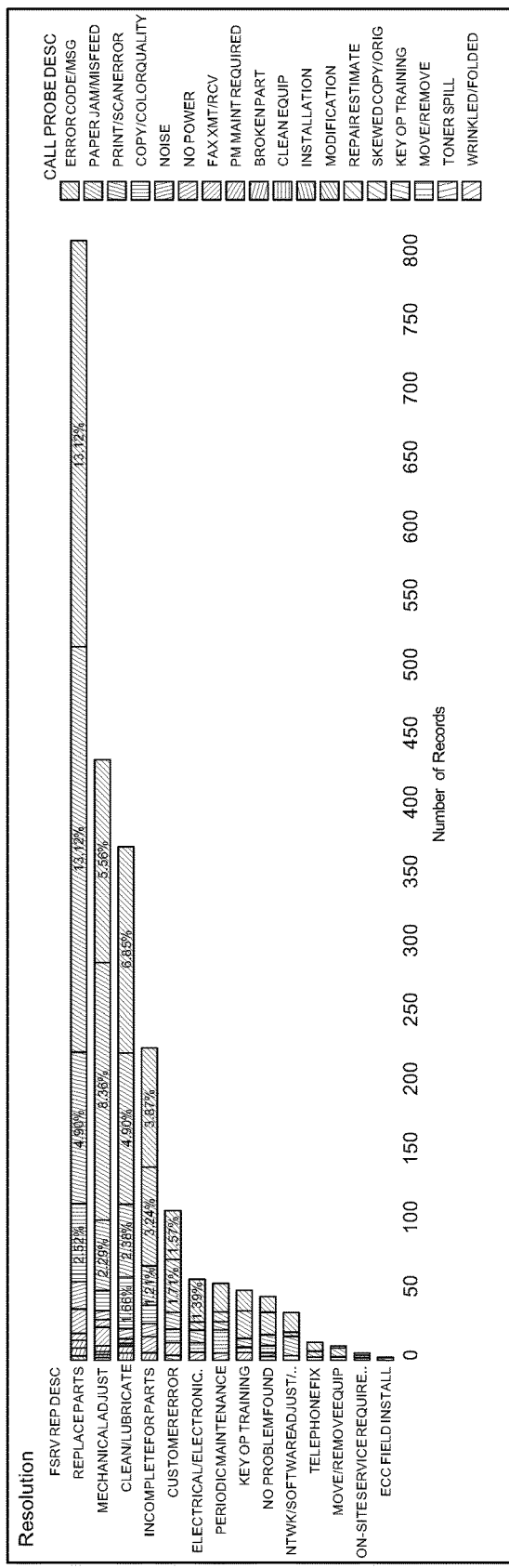
FIG. 9 is an example embodiment of resolution of device failures.

FIG. 8 is an example embodiment of breakdown of device symptoms 800 for determination of service call likelihood. FIG. 9 is an example embodiment of problem resolutions 900 associated with device error conditions. Resolutions 900 can be ranked and presented as potential resolution options for preventative service calls.

Figure 10:
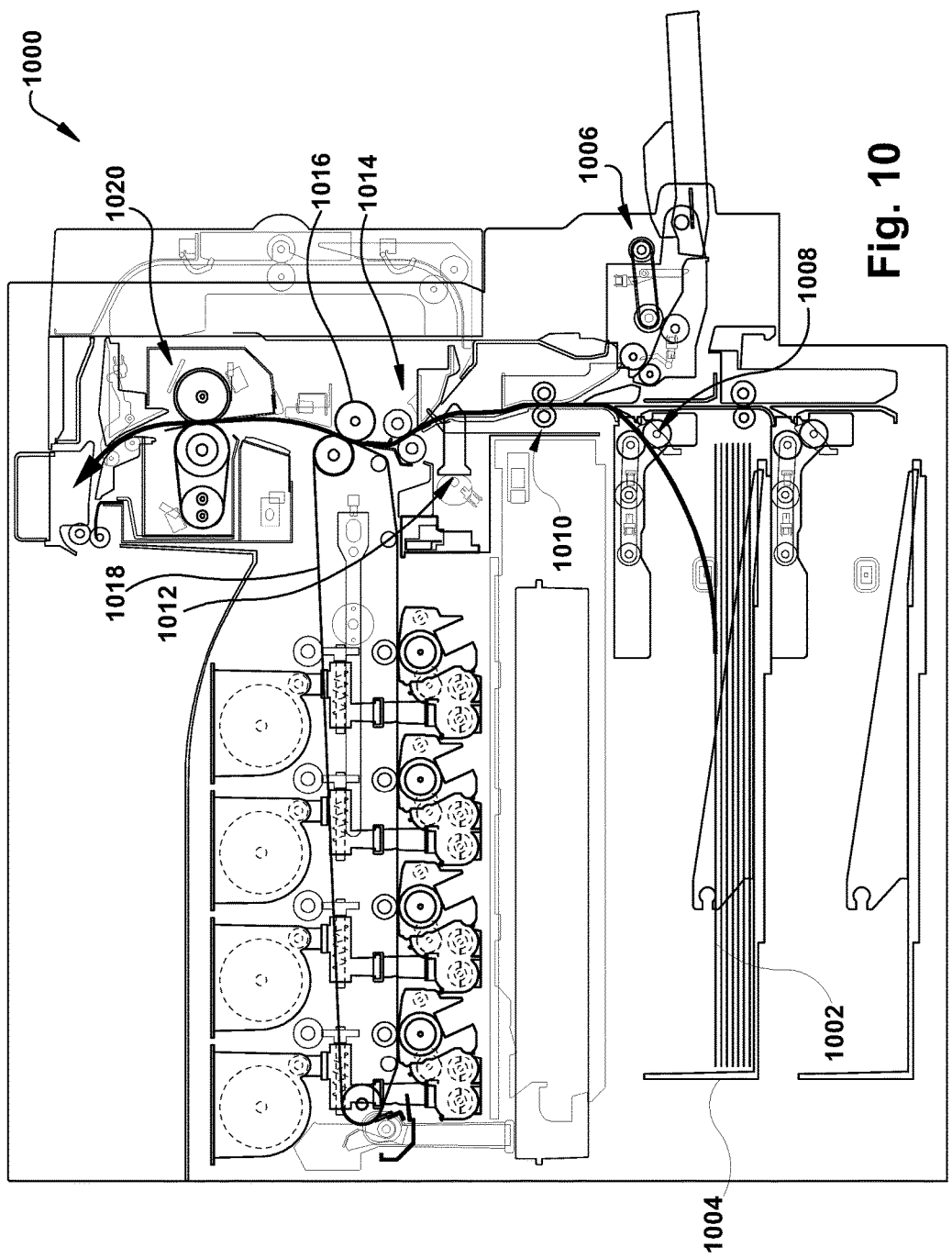
FIG. 10 is a cross section of an example embodiment of a multifunction peripheral.

FIG. 10 is a cross sectional view of a portion of an MFP, such as with one of MFPs 104 of FIG. 1. As will be detailed below, an MFP paper path has many points where a paper jam may occur. Each mechanical paper touch point can provide for possible jams. A paper path illustrated by the arrowed line starts with a paper 1002 being picked up by rollers 1008 from paper tray 1004 as shown, or from a sheet bypass feed 1006. Rollers 1008 suitably include a pickup roller, a feed roller, and a separation roller. A pair of transport rollers 1010 receive paper 1002 and urge it past a position detection sensor 1012 to a pair of registration rollers 1014. The position detection sensor 1012 detects a leading edge of paper 1002 and the trailing edge of paper 1002 as paper 1002 moves between transport rollers 1010 and registration rollers 1014. Registration rollers 1014 urge paper 1002 into the nip between transfer roller 1016 and transfer belt 1018. Transfer roller 1016 has an electrical charge that causes toner on transfer belt 1018 to transfer from transfer belt 1018 to paper 1002. Paper 1002 enters fuser 1020 where the toner is fused to the paper by heat. Fuser 1020 suitably includes a fuser roller, fuser belt, and pressure roller. A paper length can be determined by a difference between a time of a leading edge sensing versus a time for sensing a trailing edge. For a known paper size, and with known paper speed, a determination can be made if the leading edge and trailing edge are too close to one another, possibly indicating a paper jam. Other sensors can be suitably implemented in the paper path to determine relative paper position during a jam. By way of further example, monitoring of rotation of feeder wheels can indicate that a wheel moves too much or too little for an expected paper size, thus indicating a potential paper jam. An array of such sensors can allow for detailed positioning of paper within an MFP to determine printer jam properties.

Device training for predicative paper jams, such as illustrated by block 512 of FIG. 5, uses historical data to train machine learning modules. Training allows for machine prediction of jamming incidents. In an example embodiment process, a date of a paper jam service call is used to mark or classify training data into two classes. A fixed number of daily data of an MFP before a service call date are classified as having symptoms of failure. This fixed number of days is referred to as a prediction window. Another fixed number of daily data, older than the data from the prediction window, are classified as having no symptoms of failure. Altogether, the two fixed number of days is referred to as a sampling window.

Certain machine learning models may have difficulty finding patterns across historical set of records. Accordingly, a number of engineered features are created using a rolling window calculation, such as rolling average and standard deviation, to capture past data of a particular record. See FIG. 11. To ensure that each record has enough past data to calculate the rolling values, only data from sampling window minus a rolling window will be used to train the model.

Each training set suitably goes through a data cleansing process, such as illustrated by block 508 of FIG. 5. In a suitable cleansing process:
Overlapping sets are removed
Training set with high ratio of missing data are removed
Missing values in a set is filled with last available values
Rolling values are calculated Once training has been done, a prediction process can be implemented. The training sets are then used to train various machine learning models. The one that gives better prediction will be selected for the prediction process. In a suitable prediction process, live daily data are collected and the same method of creating rolling values on the training data are used to calculate the rolling values for the current day data. The result is passed to the trained model for prediction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
a network interface configured for ongoing, automated receipt of paper jam data from an identified, networked multifunction peripheral, the paper jam data corresponding to paper jams experienced by the multifunction peripheral; and
a processor and associated memory,
the memory configured to store service call data for the multifunction peripheral indicative of prior service calls placed for the multifunction peripheral,
the processor configured to define a sampling window of the paper jam data prior to a service call date,
the processor further configured to determine a point in the sampling window when no symptoms of a forthcoming paper jam were present so as to define a prediction window,
the processor further configured to determine a relationship between paper jam data in the prediction window of the sampling window and paper jam data outside the prediction window in the sampling window, and
the processor further configured to generate relationship data corresponding to a determined relationship, the processor further configured to monitor incoming paper jam data relative to the relationship data, and the processor further configured to generate a paper jam warning when monitored incoming paper jam data indicates a forthcoming paper jam on the multifunction peripheral.

2. The system of claim 1 wherein the processor is further configured to generate the sampling window as a rolling window relative to incoming paper jam data.

3. The system of claim 2 wherein the processor is further configured to determine a standard deviation value for incoming paper jam data relative to the rolling window.

4. The system of claim 3 wherein the relationship data corresponds to a determined standard deviation.

5. The system of claim 1 wherein the paper jam data includes data corresponding to a frequency of paper jams.

6. The system of claim 1 wherein the paper jam data includes data corresponding to a page count for paper processed by the multifunction peripheral.

7. The system of claim 1 wherein the memory is further configured to store replacement part data corresponding to replacement parts associated with the multifunction peripheral and wherein the processor is further configured to monitor incoming paper jam data relative to the replacement part data.

8. The system of claim 1 wherein the processor is further configured to initiate a service call request in accordance with a generated paper jam warning.

9. A method comprising:

receiving an automated, ongoing report of paper jam data from an identified, networked multifunction peripheral into a digital processing device including a processor and associated memory, the paper jam data corresponding to paper jams experienced by the multifunction peripheral;

storing, in the memory, service call data for the multifunction peripheral indicative of prior service calls placed for the multifunction peripheral;

defining a sampling window of the paper jam data prior to a service call date;

determining, by the processor, a point in the sampling window when no symptoms of a forthcoming paper jam were present so as to define a prediction window;

determining, by the processor, a relationship between paper jam data in the prediction window of the sampling window and paper jam data outside the prediction window in the sampling window;

generating, by the processor, relationship data corresponding to a determined relationship;

monitoring, by the processor, incoming paper jam data relative to the relationship data; and generating, by the processor, a paper jam warning when monitored incoming paper jam data indicates a forthcoming paper jam on the multifunction peripheral.

10. The method of claim 9 further comprising generating the sampling window as a rolling window relative to incoming paper jam data.

11. The method of claim 10 further comprising determining a standard deviation value for incoming paper jam data relative to the rolling window.

12. The method of claim 11 wherein the relationship data corresponds to a determined standard deviation.

13. The method of claim 9 wherein the paper jam data includes data corresponding to a frequency of paper jams.

14. The method of claim 9 wherein the paper jam data includes data corresponding to a page count for paper processed by the multifunction peripheral.

15. The method of claim 9 further comprising:

storing replacement part data corresponding to replacement parts associated with the multifunction peripheral; and monitoring incoming paper jam data relative to the replacement part data.

16. The method of claim 9 further comprising initiating a service call request in accordance with a generated paper jam warning.

17. A system comprising:

a network interface configured for ongoing, automated receipt of paper jam data from a plurality of identified, networked multifunction peripherals, the paper jam data corresponding to paper jams experienced by the multifunction peripheral; and a processor and associated memory, the memory configured to store service call data for the multifunction peripheral indicative of prior service calls placed for each of the multifunction peripherals, the processor configured to define a sampling window of the paper jam data for each of the multifunction peripherals relative one of its earlier service call dates, the processor further configured to determine a point in each sampling window when no symptoms of a forthcoming paper jam were present so as to define a prediction window for each multifunction relative to its earlier service call date, the processor further configured to determine a relationship between paper jam data in each prediction window of each sampling window and paper jam data outside each prediction window in each sampling window, the processor further configured to generate relationship data corresponding to a determined relationship, the processor further configured to monitor incoming paper jam data relative to the relationship data for each of the multifunction peripherals, and the processor further configured to generate a paper jam warning when monitored incoming paper jam data indicates a forthcoming paper jam on any identified multifunction peripheral.

18. The system of claim 17 wherein the processor is further configured to generate a service call request identifying multifunction peripheral indicated for a forthcoming paper jam.

19. The system of claim 17 wherein the processor is further configured to cleanse incoming paper jam data.

20. The system of claim 19 wherein the processor is further configured to cleanse the incoming paper jam data by a removal of overlapping data sets or removal of data with missing elements.

* * * * *